(12) United States Patent
Kramer, Jr. et al.

(10) Patent No.: US 7,431,054 B2
(45) Date of Patent: Oct. 7, 2008

(54) BREATHING AIR HOSE AND METHOD OF MAKING SAME

(75) Inventors: Vance M. Kramer, Jr., Perrysburg, OH (US); J. Todd Grayson, Perrysburg, OH (US)

(73) Assignee: Crushproof Tubing Company, McComb, OH (US)

( * ) Notice: Subject to any disclaimer, the term of this patent is extended or adjusted under 35 U.S.C. 154(b) by 8 days.

(21) Appl. No.: 11/463,189

(22) Filed: Aug. 8, 2006

(65) Prior Publication Data

US 2008/0035229 A1 Feb. 14, 2008

(51) Int. Cl.
*F16L 9/14* (2006.01)
(52) U.S. Cl. .............. 138/133; 138/134; 138/129; 138/130; 138/143; 138/109
(58) Field of Classification Search ............ 138/121, 138/143, 132–134, 122, 129, 130, 144, 109
See application file for complete search history.

(56) References Cited

U.S. PATENT DOCUMENTS

| 375,877 A | * | 1/1888 | Judson | 138/133 |
|---|---|---|---|---|
| 1,052,106 A | * | 2/1913 | Voorhees | 138/127 |
| 1,974,285 A | * | 9/1934 | Maclachlan | 138/133 |
| 2,396,059 A | * | 3/1946 | Roberts | 138/122 |
| 2,475,591 A | * | 7/1949 | Chernack | 138/133 |
| 2,913,011 A | * | 11/1959 | Noyes et al. | 138/133 |
| 3,047,026 A | * | 7/1962 | Kahn | 138/122 |
| 3,635,255 A | * | 1/1972 | Kramer | 138/122 |
| 4,098,298 A | * | 7/1978 | Vohrer | 138/122 |
| 4,578,855 A | * | 4/1986 | Van Der Hagen | 29/447 |
| 4,982,765 A | * | 1/1991 | Usui | 138/122 |
| 5,062,457 A | * | 11/1991 | Timmons | 138/125 |
| 5,806,567 A | * | 9/1998 | Fukui et al. | 138/132 |

* cited by examiner

*Primary Examiner*—Patrick F Brinson
(74) *Attorney, Agent, or Firm*—Rankin, Hill & Clark LLP

(57) ABSTRACT

A method of manufacturing a wire-reinforced flexible rubber hose that is particularly suitable for use in breathing air applications. The method includes positioning a section of wire-reinforced tubing on a forming mandrel and then positioning a sleeve of uncured rubber to cover the section of wire-reinforced tubing. Cording is then wrapped around the sleeve of uncured rubber such that each adjacent wrapping of cording is disposed between and separated by the wire helix of the wire-reinforced tubing. The sleeve of uncured rubber is cured while the cording is wrapped thereon to form a cured hose.

2 Claims, 5 Drawing Sheets

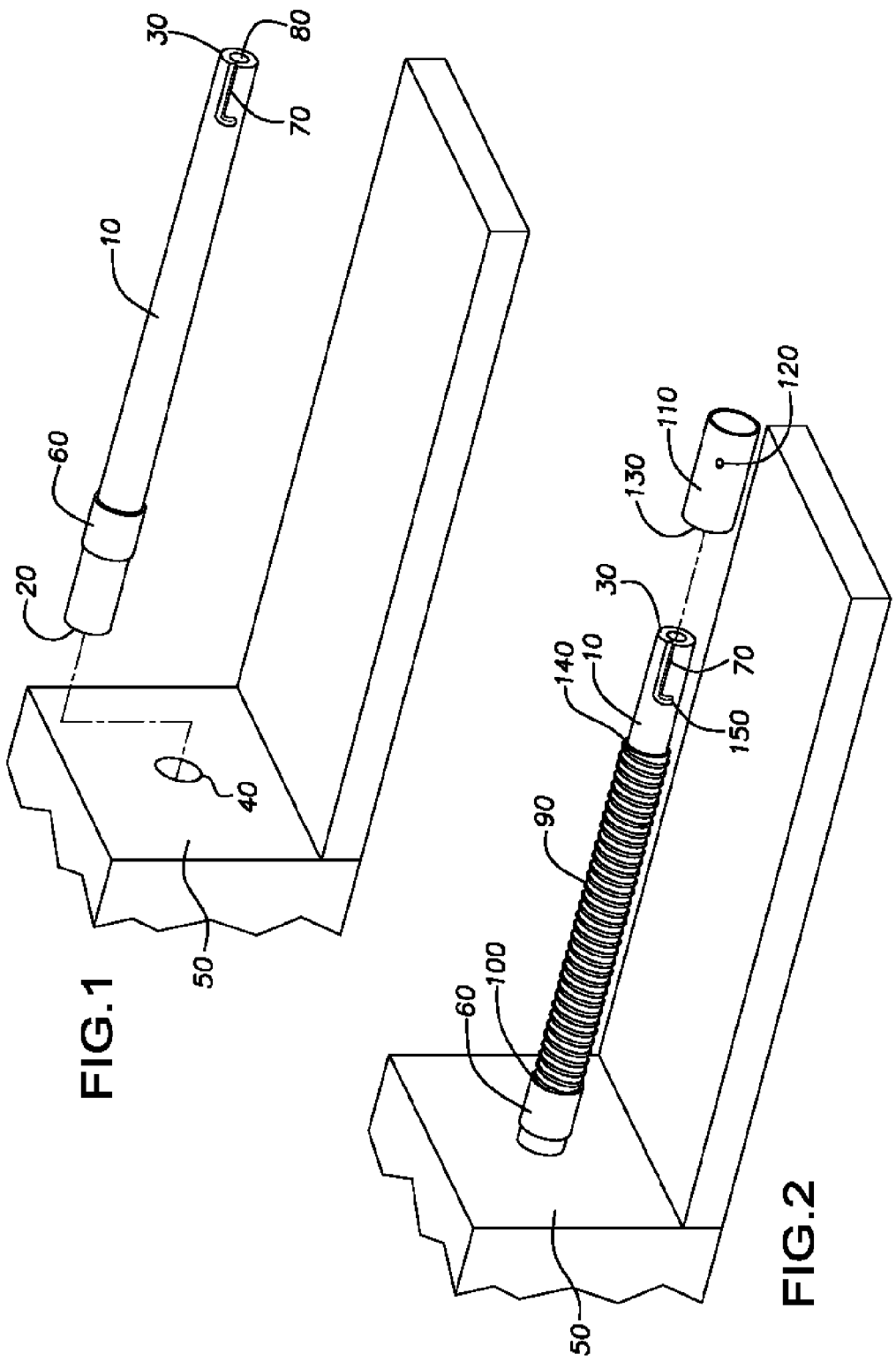

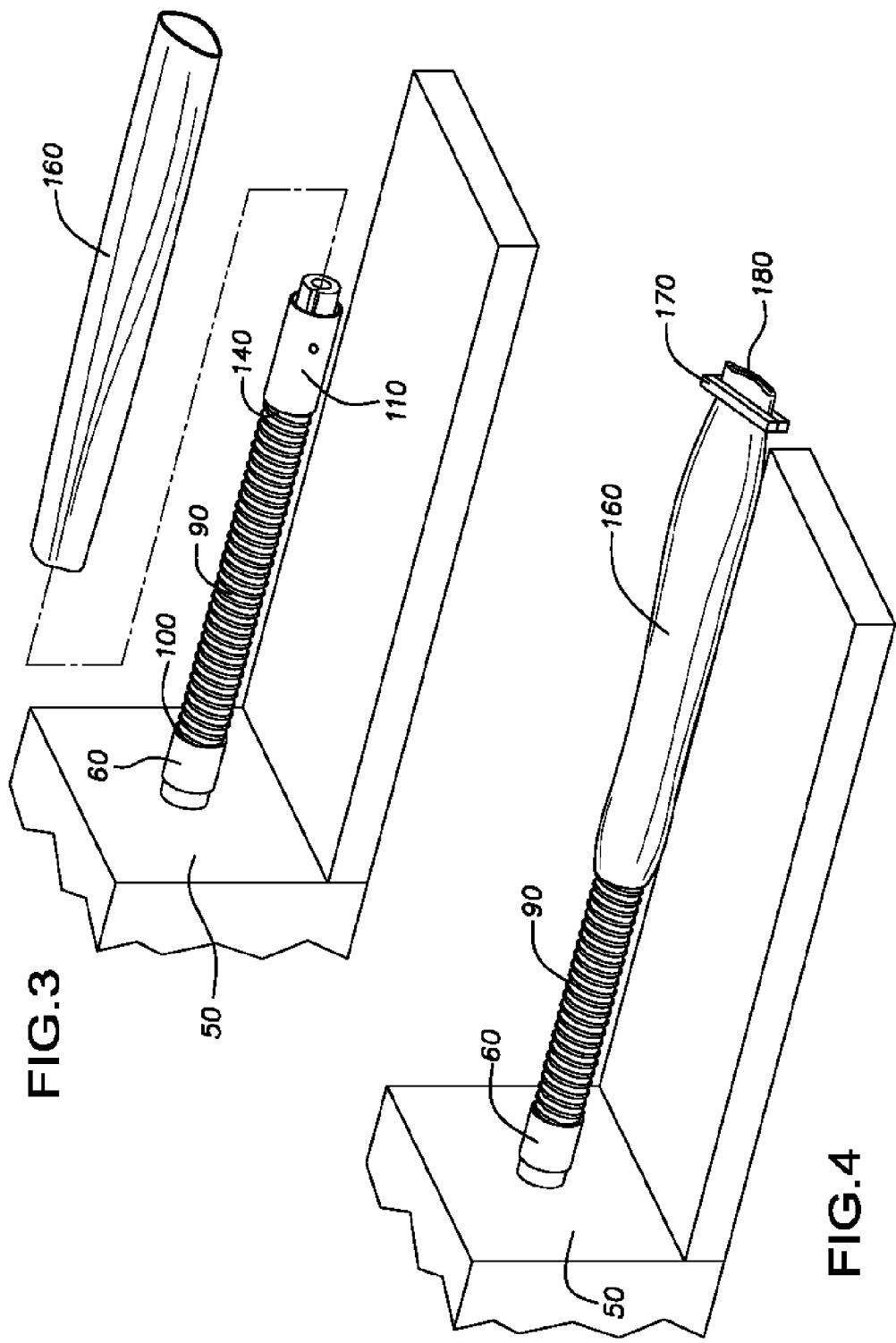

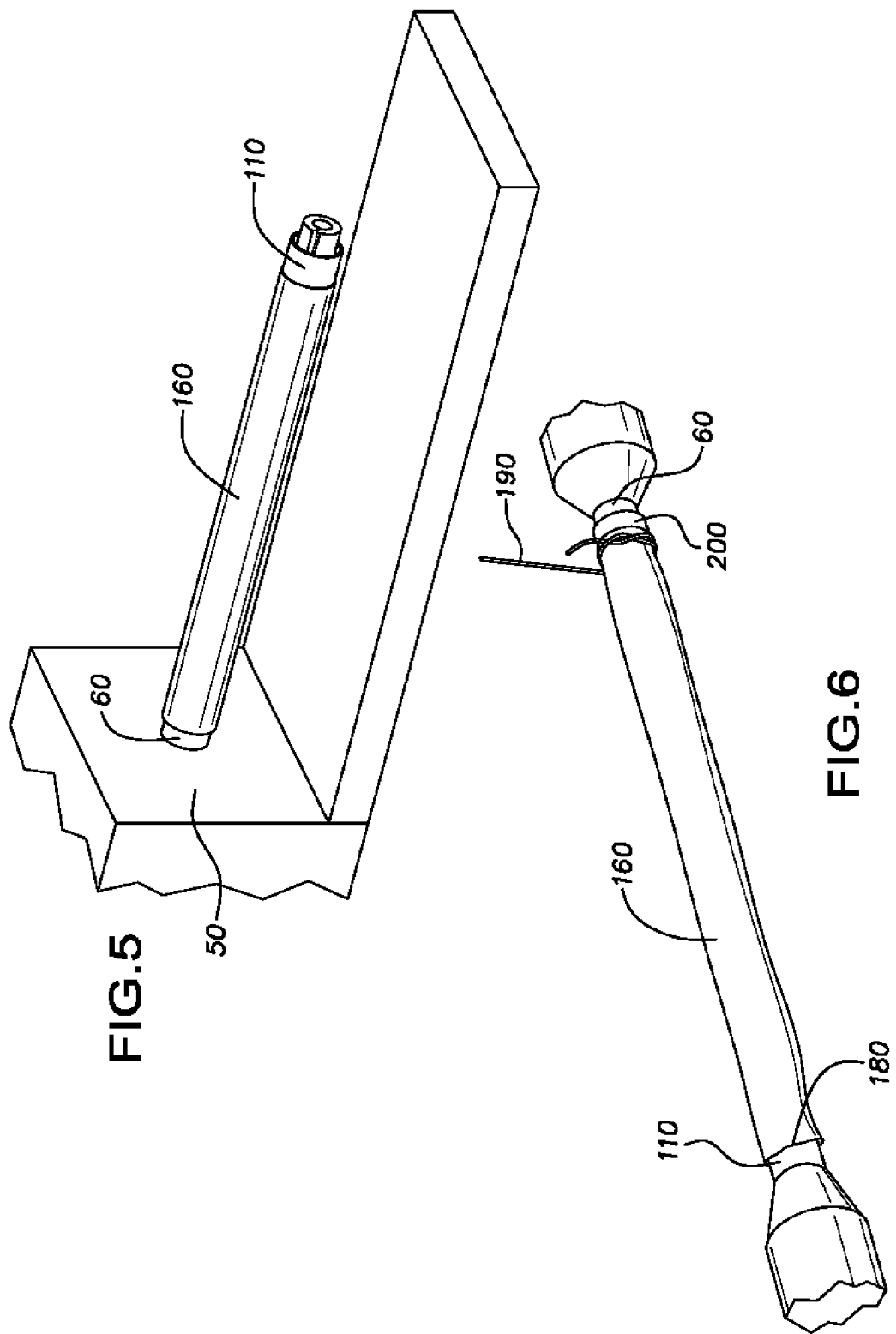

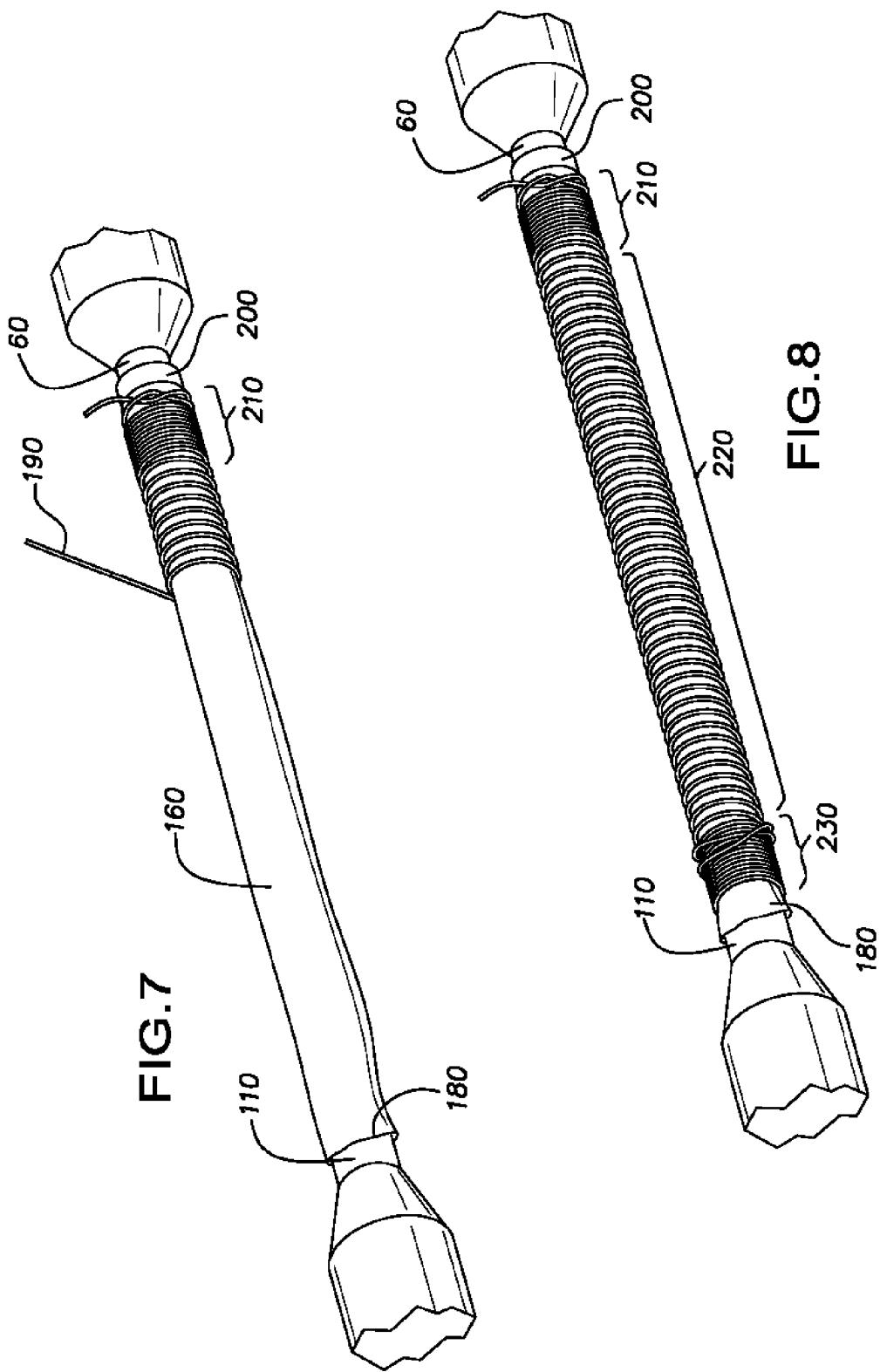

BREATHING AIR HOSE AND METHOD OF MAKING SAME

BACKGROUND OF THE INVENTION

1. Field of Invention

The present invention relates to a method of manufacturing a wire-reinforced flexible rubber hose that is particularly suitable for use in breathing air applications.

2. Description of Related Art

Hoses used in breathing air applications need to exhibit excellent resistance to degradation from a variety of threats including, for example, ultraviolet (UV) light, heat, chemicals and physical crushing. In the past, rubber hoses with helical or annular corrugations have been used in such applications. Such rubber hoses, while providing excellent resistance to a variety of degradation threats, tend to be relatively heavy. In addition, the corrugations along the inner wall or bore of the hose can create a turbulent air flow. Hoses formed of thermoplastic materials tend to be lighter than rubber hoses, but lack the resistance to degradation threats afforded by rubber hoses.

SUMMARY OF THE INVENTION

The present invention provides a method of manufacturing a wire-reinforced flexible rubber hose that is particularly suitable for use in breathing air applications. The method comprises positioning a section of wire-reinforced tubing on a forming mandrel and then positioning a sleeve of uncured rubber to cover the section of wire-reinforced tubing. Cording is then wrapped around the sleeve of uncured rubber such that each adjacent wrapping of cording is disposed between and separated by the wire helix of the wire-reinforced tubing. The sleeve of uncured rubber is cured while the cording is wrapped thereon to form a cured hose.

A hose according to the invention is particularly suitable for use in breathing air applications such as, for example, gas masks and portable breathing apparatus. The cured hose has a relatively smooth bore, which promotes substantially laminar air flow. Because all three plies of the cured hose can be formed from relatively thin walled materials, the resulting cured hose is lighter in weight than comparable all-rubber hoses. The cured rubber outer ply provides excellent chemical resistance, flexibility, heat resistance and UV resistance. The middle and inner plies provide flexibility, weight savings and excellent air flow.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

BRIEF DESCRIPTION OF THE DRAWINGS

FIG. 1 is a perspective view of a mandrel being readied for insertion into a rotary support.

FIG. 2 is a perspective view of a two-ply wire-reinforced hose supported on the mandrel shown in FIG. 1.

FIG. 3 is a perspective view of a sleeve of uncured rubber being readied for placement over the two-ply wire-reinforced hose on the mandrel shown in FIG. 2.

FIG. 4 is a perspective view of the sleeve of uncured rubber shown in FIG. 3 as it is being placed over the two-ply wire-reinforced hose on the mandrel.

FIG. 5 is a perspective view of the sleeve of uncured rubber after it has been placed over the two-ply wire-reinforced hose on the mandrel shown in FIG. 4.

FIG. 6 is a perspective view of cording being tied around one end of the sleeve of uncured rubber on the mandrel shown in FIG. 5.

FIG. 7 is a perspective view of cording being wrapped around the sleeve of uncured rubber on the mandrel shown in FIG. 6.

FIG. 8 is a perspective view of cording completely wrapped around the sleeve of uncured rubber on the mandrel shown in FIG. 7.

DESCRIPTION OF THE PREFERRED EMBODIMENTS

Figure 9:
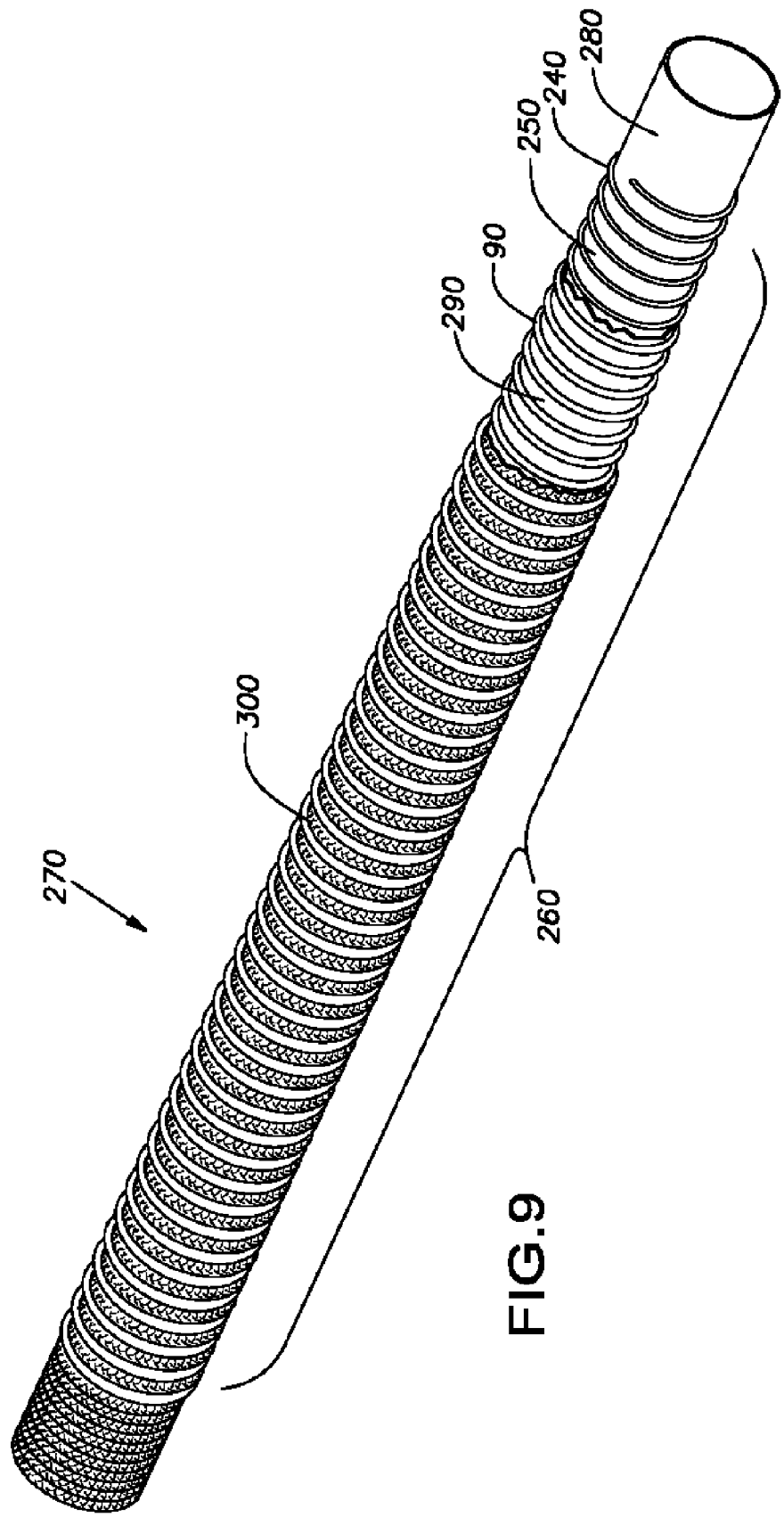
FIG. 9 is a perspective view of a breathing air hose according to the invention with layers stripped away on one end to show detail.

A preferred method of manufacturing a hose according to the invention is generally shown with reference to the accompanying figures. FIG. 1 shows an elongated, rigid, tubular mandrel 10 having a first end 20 and a second end 30. The first end 20 of the mandrel 10 is configured for insertion into a chuck 40 of a support 50. Preferably, the support 50 includes a compressed air source that can be controlled to selectively blow air through a conduit formed through the length of the mandrel 10 and out an opening 80 in the second end 30 of the mandrel 10. A fixed collar 60 is preferably formed on or affixed to the mandrel 10 a predetermined distance away from the second end 30. A J-channel groove 70 is preferably formed in the mandrel 10 at the second end 30.

With reference to FIG. 2, the second end 30 of the mandrel is inserted into the central bore of a section of wire-reinforced tubing 90 and the section of wire-reinforced tubing 90 is slipped onto the mandrel 10 until one end 100 of the wire-reinforced tubing 90 abuts against the fixed collar 60. The section of wire-reinforced tubing 90 preferably has an inner diameter that is about the same as the outer diameter of the mandrel 10. A lubricant such as silicone oil, for example, can be used, if necessary, to assist in sliding the section of wire-reinforced tubing 90 onto the mandrel 10.

The section of wire-reinforced tubing 90 is preferably formed of two plies of thermoplastic elastomeric material, which are bonded together to sandwich a helical wire therebetween. The plies of thermoplastic elastomeric material are preferably thin (e.g., having a thickness of from about 1/64" (~0.4 mm) to about 1/32" (~0.8 mm), and are thermoformed using little or no adhesives. The section of wire-reinforced tubing 90 can be of any diameter, but an inner diameter of from about 3/4" (~19 mm) to about 2" (~51 mm) is particularly suitable for use in breathing air applications. The gauge of the wire in the section of wire-reinforced tubing 90 is not critical, but a gauge of from about 14 to about 20 is preferred. The spacing between the wire helix is preferably from about 1/8" (~3 mm) to about 3/8" (~9 mm), which provides excellent crush resistance, and flexibility. The presently most preferred wire-reinforced tubing for use in the invention is available from Hi-Tech Duravent of Georgetown, Mass. under the VAC-U-FLEX® TPE trade designation. The VAC-U-FLEX® TPE product consists of two thin plies of thermoplastic elastomer material that encapsulate a coated spring steel helix.

Once the section of wire-reinforced tubing 90 is in place on the mandrel 10, a removable collar 110 is positioned on the second end 30 of the mandrel 10. Preferably, the removable collar 110 includes an inwardly extending dent or pin 120 that is configured to slide into the J-channel groove 70. As the removable collar 110 is pushed onto the mandrel 10, the leading edge 130 of the removable collar 110 preferably contacts the other end 140 of the section of wire-reinforced tubing 90, the slight compression of the section of wire-reinforced tubing 90 creates a spring force that presses the pin 120 into the bottom portion 150 of the J-channel groove 70 thereby releasably locking the removable collar 110 to the mandrel 10.

FIG. 3 shows the removable collar 110 releasably locked onto the mandrel 10. Once the removable collar 110 is releasably locked in place, one end 100 of the section of wire-reinforced tubing 90 abuts the fixed collar 60 and the other end 140 abuts the removable collar 110. The fixed collar 60 and removable collar 110 each preferably have a smooth outer circumference that serves as a hose coupling-joint former. The outer diameter of the fixed collar 60 and the removable collar 110 need not be the same. The outer diameter of each collar 60, 110 can be larger than or the same as the outer diameter of the wire reinforced tubing 90 as is necessary to form a desired hose coupling-joint connection. It will also be appreciated that the spacing between the fixed collar 60 and the removable collar 110 on the mandrel 10 can be adjusted, as necessary, to accommodate a section of wire-reinforced tubing 90 of desired length.

With further reference to FIG. 3, a sleeve 160 of uncured rubber is provided. The composition of the uncured rubber is not critical, and a variety of uncured rubber compounds can be used. Suitable uncured rubber compounds include rubbers made from conjugated diene monomers having from 4 to 12 carbon atoms, or such diene monomers in combination with vinyl substituted aromatic monomers having from 8 to 12 carbon atoms. Examples of specific rubber compounds include rubbers formed from monomers of butadiene, isoprene, pentadiene, styrene, alpha-methylstyrene and the like. Uncured natural rubber can also be used. The sleeve 160 of uncured rubber preferable has a thickness of from about 3/64" (~1 mm) to about 3/32" (~2 mm), with a thickness of about 4/64" (~1.5 mm) being presently preferred for the fabrication of breathing air hoses.

The sleeve 160 of uncured rubber must have a length sufficient to cover the entire section of wire-reinforced tubing 90 and at least a portion of both the fixed collar 60 and the removable collar 110. The sleeve 160 of uncured rubber preferably has an inner diameter that is slightly smaller than the outer diameter(s) of the section wire-reinforced tubing 90, the fixed collar 60 and/or the removable collar 110. The sleeve 160 of uncured rubber can be cut to the desired length prior to being slipped over the section wire-reinforced tubing 90, the fixed collar 60 and/or the removable collar 110, or can be cut to the desired length after being slipped over the section wire-reinforced tubing 90, the fixed collar 60 and/or the removable collar 110.

As shown in FIG. 4, the sleeve 160 of uncured rubber is positioned over the section of wire-reinforced tubing 90 on the mandrel 10 by inserting the second end 30 of the mandrel 10 into the central bore through the sleeve 160 of uncured rubber. A lubricant such as silicone oil can be used to facilitate placement of the sleeve 160 of uncured rubber over the mandrel 10 and section of wire-reinforced tubing 90. To further assist in positioning the sleeve 160 of uncured rubber over the mandrel 10 and section of wire-reinforced tubing 90, air can be pumped through the conduit in the mandrel 10 and out the opening 80. A clamp 170 can be used to create a temporarily seal near the trailing end 180 of the sleeve 160 of uncured rubber. Air exiting the opening 80 thereby causes the sleeve 160 to partially inflate and expand, which assists in positioning the sleeve 160 on the mandrel 10 and section of wire-reinforced tubing 90 as desired. It will be appreciated that a clamp 170 may not be needed in some instances, and that a temporary seal can be formed simply by pinching the trailing end 180 of the sleeve 160 together using one's fingers. FIG. 5 shows the sleeve 160 of uncured rubber positioned on the mandrel 10 so as to cover the section of wire-reinforced tubing 90 and at least a portion of both the fixed collar 60 and the removable collar 110.

With reference to FIG. 6, cording 190 is tied around the sleeve 160 of uncured rubber near the leading end 200. The cording 190 is tied such that it presses the sleeve 160 of uncured rubber tightly against the outer circumference of the fixed collar 60. With reference to FIG. 7, the mandrel 10 is rotated while tension is applied to the cording thereby causing the cording 190 to wrap around the sleeve 160 of uncured rubber 160 and press it tightly against the outer circumference of the fixed collar 60. The mandrel 10 can be removed from the support 50 and placed in a suitable device such as a lathe, for example, for rotation. Alternatively, the chuck 40 of the support 50 can be coupled to a rotary drive that can be controlled to selectively rotate the mandrel 10 about its longitudinal axis while the mandrel 10 is held in the support 50.

In the region 210 where the sleeve 160 of uncured rubber is disposed over the fixed collar 60, the cording 190 is tightly wrapped around the sleeve 160 of uncured rubber with very little, if any, spacing between successive wraps. Once the wraps of cording reach the region 220, which begins where the wraps around the sleeve 160 of uncured rubber transition from being over the fixed collar 60 to being over the wire-reinforced tubing, the cording 190 is pressed into the space 250 (see FIG. 9) between the helical wire 240 in the wire-reinforced tubing 90. Thus, in this region 220, each successive wrap of the cording 190 is spaced by the wire in the wire-reinforced tubing, and the cording 190 presses the sleeve 160 of uncured rubber between the wire 240 near to the mandrel 10. Once the wraps of cording reach the region 230, which begins where the wraps around the sleeve 160 of uncured rubber transition from being over the wire-reinforced tubing 90 to being over the removable collar 110, the cording 190 is again wrapped around the sleeve 160 of uncured rubber with very little, if any, spacing between successive wraps. The cording 190 is then tied around the sleeve 160 of uncured rubber near the trailing end 180, as shown in FIG. 8.

It will be appreciated that the cording 190 need not be tied around the sleeve 160 of uncured rubber near the leading end 200 first. Alternatively, the cording 190 could be tied around the sleeve 160 of uncured rubber near the trailing end 180 first, and then wrapped around the sleeve 160 of uncured rubber in the opposite direction. It is only important that the cording 190 be wrapped around the sleeve 160 of uncured rubber in each of the three regions 210, 220, 230 as shown in FIG. 8.

The mandrel 10 containing the section of wire-reinforced tubing 90, fixed collar 60, removable collar 110, sleeve 160 of uncured rubber and tied, wrapped cording 190 is then heated to a temperature and for a time suitable to cure the sleeve 60 of uncured rubber using any conventional means, such as autoclaves and ovens, as is well known in the art. Once the sleeve 160 of uncured rubber has been cured, the cording 190 is unwound and removed from the assembly. The removable collar 110 is pressed inwardly and twisted slightly to unlock the pin 120 from bottom portion 150 of the J-channel groove 70. Once the removable collar 110 is removed from the mandrel 10, the cured hose 270 is removed from the mandrel 10 using a pulling motion. The cured rubber hose 270 will retain its general shape after the cording 190 is removed.

With reference to FIG. 9, a central portion 260 of the cured hose 270 includes a thin, inner ply 280 formed of thermoplastic elastomer, a helical reinforcing wire 240 that is wrapped around the first inner ply 280, and a thin, middle ply 290 formed of thermoplastic elastomer that covers the helical reinforcing wire 240 and is bonded to the first inner ply 280. The cured hose 270 further comprises an outer ply formed of cured rubber 300, which includes a helix of ridges and valleys. The ridges overly the reinforcing wire 240. The valleys extend between the reinforcing wire 240. No adhesives are necessary to bond the outer ply of cured rubber 300 to the middle ply 290 of thermoplastic elastomer 290. The cured hose 270 according to the invention has a smoother bore than conventional helical corrugated rubber hoses, which promotes a substantially laminar flow of air through the cured hose 270. Each end of the cured hose 270 features a smooth walled hose-coupling joint that can be slipped over and clamped onto a tubular structure.

A cured hose according to the invention is particularly suitable for use in breathing air applications such as, for example, gas masks and portable breathing apparatus. The cured hose has a relatively smooth bore, which promotes substantially laminar air flow. Because all three plies of the cured hose can be formed from relatively thin walled materials, the resulting cured hose is lighter in weight than comparable all-rubber hoses. The cured rubber outer ply provides excellent chemical resistance, flexibility, heat resistance and UV resistance. The middle and inner plies provide flexibility, weight savings and excellent air flow.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. A hose consisting of:
   a tubular inner ply formed of a thermoplastic elastomeric material, said inner ply having an inner surface that defines a substantially smooth bore;
   a metal wire helix disposed circumferentially around an outer surface of the inner ply;
   an intermediate ply formed of a thermoplastic elastomeric material, the intermediate ply covering the metal wire helix and being bonded to the inner ply without the use of any adhesives to encapsulate the metal wire helix; and
   an outer ply comprising a cured sleeve of rubber, the cured sleeve of rubber having an outer surface comprising adjacent valleys and peaks, the valleys being arranged in a space between adjacent wraps of the metal wire helix encapsulated between the inner ply and the intermediate ply and the peaks being arranged above the metal wire helix;
   wherein there is no adhesive between the outer ply and the intermediate ply, and wherein an end of the hose is provided with an integral coupling joint formed only of the cured sleeve of rubber, the coupling joint having a substantially smooth inner bore.

2. A three-ply hose consisting of:
   a tubular inner ply formed of a thermoplastic elastomeric material having a thickness of from about $1/64''$ to about $1/32''$, the inner ply having an inner surface that defines a substantially smooth bore;
   a helix wrapped circumferentially around an outer surface of the inner ply, the helix being formed of a metal wire having a gauge of from about 14 to about 20 and having a spacing between adjacent circumferential wrappings of from about $1/8''$ to about $3/8''$;
   an intermediate ply formed of a thermoplastic elastomeric material having a thickness of from about $1/64''$ to about $1/32''$, the intermediate ply covering the helix and being bonded to the inner ply to encapsulate the helix without the use of any adhesives; and
   an outer ply comprising a cured sleeve of rubber having a thickness of from about $3/64''$ to about $3/32''$, the cured sleeve of rubber having an outer surface comprising adjacent valleys and peaks, the valleys being arranged in a space between adjacent wraps of the helix encapsulated between the inner ply and the intermediate ply and the peaks being arranged above the helix;
   wherein there is no adhesive between the outer ply and the intermediate ply and wherein an end of the hose is provided with an integral coupling joint formed only of the cured sleeve of rubber, the coupling joint having a substantially smooth inner bore.

* * * * *